May 19, 1970 — A. B. HARBAGE, JR — 3,512,854

LOW FRICTION THRUST BEARING

Filed Dec. 27, 1967

INVENTOR
ALFRED B. HARBAGE, JR.

BY Albert Hopp
D. D. Hodges
ATTORNEYS

3,512,854
LOW FRICTION THRUST BEARING

Alfred B. Harbage, Jr., Annapolis, Md., assignor to the United States of America as represented by the Secretary of the Navy
Filed Dec. 27, 1967, Ser. No. 693,979
Int. Cl. F16c *17/06*
U.S. Cl. 308—160           6 Claims

ABSTRACT OF THE DISCLOSURE

A thrust bearing employs rotating thrust pads for low friction and for counter-rotating shafts. Flow directing means including dam means are provided in the spaces between the thrust pads to insure uniform lubricant flow over the working surfaces of the thrust pads.

---

The invention described herein may be manufactured and used by or for the Government of the United States of America for governmental purposes without the payment of any royalties thereon or therefor.

BACKGROUND AND SUMMARY

In a conventional oil-immersed thrust bearing having a rotating bearing disc, the thrust pads are often tiltably mounted on a fixed plate, there being a radial space between each pair of pads. If, in attempting to provide a thrust bearing for counter-rotating shafts, one simply attaches the conventional thrust pad plate to an outer shaft, the disc bearing being connected to an inner shaft or vice versa, the oil moves both outwardly from the bearing under centrifugal force and oppositely to the direction of rotation of the thrust pad plate due to Coriolis force. The oil seeks the spaces between the pads and flows at such a rapid rate radially outward therefrom that lubricant fails to reach the working surfaces of the thrust pad. In the situation described above, the centrifugal and Coriolis forces are of the same order of magnitude.

The present invention overcomes the above difficulty by providing a dam impeding the flow of lubricant in the spaces between the pads, the lubricant being directed by said dam and wedge shaped leading edge of each pad toward the leading edge of the working surface of the thrust pad. A steady and uniform reservoir of lubricant is thus fed to the pad working surface in the desired form of a lubricant film, even though the thrust pads are themselves rotated as a unit.

In solving the counter-rotation problem, the salutory advantage of extremely low friction is also provided. Therefore, the arrangement of the present invention may also be applied to environments other than that of counter-rotating shafts, by employing rotation of a thrust pad assembly constructed according to the principles of the invention in relation to a fixed or rotating bearing disc.

Accordingly, it is among the objects of the present invention to provide a thrust bearing for counter-rotating machinery and to provide a low friction thrust bearing for general application.

Of particular advantage is the structure of the wedge and dam elements integrally with each tilting pad at a location radially inward of the pad extremity, affording lubricant flow toward, and not bypassing, the pad surfaces. When placed alongside each other, the pads provide dam elements extending toward each other within the outer periphery of the shoes, affording a compact and simple thrust bearing arrangement which will provide lubricant film for both directions of rotation of the thrust pad plate.

BRIEF DESCRIPTION OF THE DRAWINGS

For a better understanding of the invention, reference is made to the accompanying drawings in which like reference numerals represent like parts and in which.

DETAILED DESCRIPTION AND OPERATION

Figure 1:
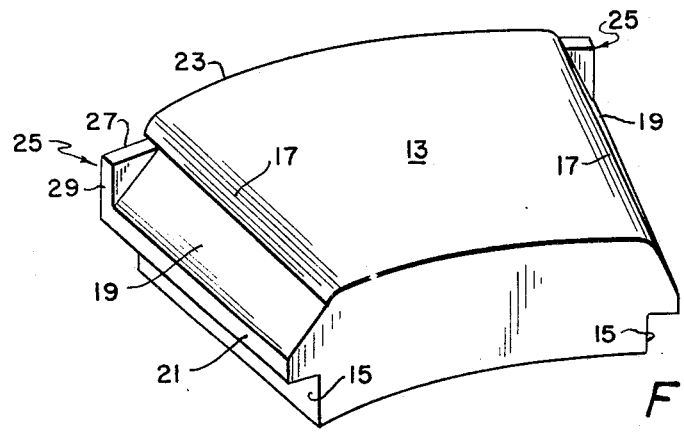
FIG. 1 is a view in perspective of a tilting pad according to the invention.

Referring to FIG. 1, there is shown a thrust pad or shoe 11 having a bearing surface 13 terminating at each radial side 15 in gently curved edges 17. Integral with each radial side 15 is a radially extending beveled shoulder or wedge 19 terminating in a flat portion along a radial 21.

Near the outermost periphery 23 of each side of the pad 11 and terminating the beveled portion of the wedge 19 is a circumferentially extending dam or wall portion 25 having a lubricant level determining end 27 parallel to and below the level of, the surface 13. The dam 25 has its other end 29 at a right angle to end 27 and coextensive with the radial 21.

Figure 2:
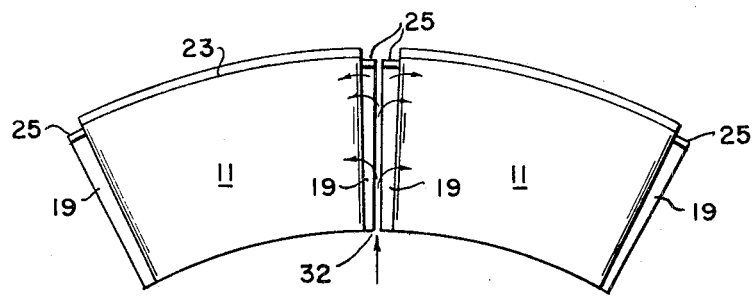
FIG. 2 is a plan view of two tilting pads side by side, with the spacing exaggerated.
Figure 3:
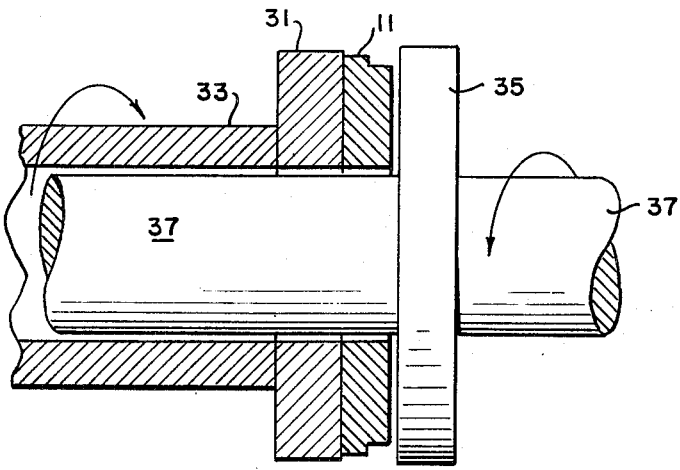
FIG. 3 is a view in longitudinal cross section of a thrust bearing for counter-rotating shafts.

Referring to FIGS. 2 and 3, the pads 11 are tiltably mounted in adjacent sector positions around a mounting plate 31 in a well known manner, each adjacent pair of wedges 19 forming a channel 32 along each wedge surface. The plate 31 is secured in any suitable manner to an outer driving shaft 33.

A bearing disc 35 may be fixedly mounted or may be mounted to a shaft 37 rotating relative to or opposite to the outer shaft 33 as indicated by the arrows. The thrust bearing as a whole is indicated by the numeral 37.

In operation, lubricant may be provided for the thrust bearing 37 in any suitable well known manner, for example, as by injection via ports (not shown) located inwardly of the pads 11 into the space separating the shafts 33, 37 near the bearing disc 35.

As shown in FIG. 2 by the radial arrows, flow of lubricant will be radially outward due to the centrifugal pumping action of all non-flush surfaces existing in the thrust bearing. Rotation of the mounting plate 31 causes action on the lubricant due to Coriolis force of about the same order of magnitude as the centrifugal force.

However, the action of dams 25, as shown by the circumferentially extending arrows in FIG. 2, is to flood the channel 32 formed by the leading wedge of the thrust pad depending on direction of rotation of the pads with the plate 31.

The flooding action of the dam 25 moves the level of lubricant flow upward on the leading wedge toward the surfaces 13 of the pads, at which level a satisfactory flow rate is maintined as a film over the entire leading edge surface 17 and onto the surface 13.

The location of the dams 25 radially inward of the side 23 insures lubricant flow toward the surface 13 and an adequate flow rate through the thrust bearing generally within the geometrical confines of the thrust pads. Location of the dams behind the surfaces 23 would reduce the efficiency of the dam/wedge action which allows the Coriolis force to act on the lubricant along essentially the entire leading wedge 19 to provide an entrant film along the curved leading edge 17.

It should be understood, of course, that the foregoing disclosure relates only to the preferred emodiment of the invention and that numerous modifications or alterations may be made therein without departing from the spirit and the scope of the invention.

What is claimed is:
1. A thrust bearing comprising:
   a bearing disc;
   a thrust pad assembly mounted coaxially with said disc and including a mounting plate and a plurality of thrust pads positioned therein to provide angular spaces between said thrust pads about the axis of said plate, each pad having its working surface facing said bearing disc to define an axial space therebetween;
   each of said thrust pads having on each radial side thereof adjacent the angular spaces body means having flow surfaces recessed below the working surface of the thrust pad;
   said thrust bearing having means for receiving lubricant near the central radial portion of said narrow space;
   means for rotating said thrust pad assembly relative to said bearing disc thereby causing pumping of lubricant radially outward essentially along the surfaces of the recessed body means; and
   flow directing means contiguous with each of said thrust pads for impeding the radially outward flow of lubricant occurring along the surfaces of said recessed body means and for enabling lubricant to pile up on said flow surfaces and to flow toward and on to the substantially entire leading edge of the working surface of each pad.

2. Apparatus according to claim 1 wherein said flow directing means comprises for each thrust pad:
   dam means located on each side of the pad at approximately the radially outward end of the flow surface of said recessed body means.

3. Apparatus according to claim 2 wherein said dam means and shaped body means are integral with the thrust pad.

4. Apparatus according to claim 1 wherein said bearing disc is rotatably mounted.

5. A thrust bearing comprising:
   a bearing disc;
   a thrust pad assembly mounted coaxially with said disc and including a mounting plate and a plurality of thrust pads positioned therein in angularly spaced apart relation about the axis of said plate, each pad having its working surface facing said bearing disc to define a narrow space therebetween;
   said thrust bearing having means for receiving lubricant near the central radial portion of said narrow space;
   means for rotating said thrust pad assembly relative to said bearing disc;
   dam means located on each side of the pad within the confines of the line describing the outer circumference portion of the thrust pad for impeding the radially outward flow of the lubricant occurring during rotation in the angular spaces between said pads and for enabling lubricant flow toward the substantially entire leading edge of the working surface of each pad; and
   shaped body means on each side of the pad radially inward of the dam means, said body means having a flow directing surface tapering toward confluence with the leading edge of the pad working surface, said tapering surface abuttting said dam means.

6. A thrust bearing comprising:
   a bearing disc;
   a thrust pad assembly mounted coaxially with said disc and including a mounting plate and a plurality of thrust pads positioned therein in angularly spaced apart relation about the axis of said plate, each pad having its working surface facing said bearing disc to define a narrow space therebetween;
   said thrust bearing having means for receiving lubricant near the central radial portion of said narrow space;
   said bearing disc being mounted for rotation with one of two counter rotating shafts, and said thrust bearing assembly is mounted for rotation with the other of said shafts; and
   flow directing means contiguous with each of said thrust pads for impeding the radially outward flow of the lubricant occurring during rotation in the angular spaces between said pads and for enabling lubricant flow toward the substantially entire leading edge of the working surface on each pad.

References Cited

UNITED STATES PATENTS

| 2,268,770 | 1/1942 | Orshansky | 308—73 |
| 3,291,543 | 12/1966 | Nigh | 308—160 |
| 1,767,238 | 6/1930 | Howarth | 308—160 |
| 1,987,849 | 1/1935 | Hanschke | 308—160 |
| 3,033,031 | 5/1962 | Gruber | 308—160 |
| 3,201,184 | 8/1965 | Hill | 308—160 |

FOREIGN PATENTS 187,497   10/1922   Great Britain.

MARTIN P. SCHWADRON, Primary Examiner

H. F. SUSKO, Assistant Examiner